United States Patent [19]

Iijima et al.

[11] Patent Number: 5,689,244
[45] Date of Patent: Nov. 18, 1997

[54] COMMUNICATION SYSTEM AND ELECTRONIC APPARATUS

[75] Inventors: Yuko Iijima; Hisato Shima, both of Kanagawa; Harumi Kawamura; Makoto Sato, both of Tokyo, all of Japan

[73] Assignee: Sony Corporation, Tokyo, Japan

[21] Appl. No.: 491,076

[22] Filed: Jun. 16, 1995

[30] Foreign Application Priority Data

Jun. 24, 1994 [JP] Japan .................................. 6-165883
Aug. 26, 1994 [JP] Japan .................................. 6-225757

[51] Int. Cl.⁶ ............................................... H04J 3/02
[52] U.S. Cl. .................... 340/825.07; 364/825; 370/357; 370/360; 395/287
[58] Field of Search ........................ 340/825.07, 825.25, 340/825.63, 825.24, 825.5; 364/140, 825; 370/85.6, 85.1, 58.1, 357, 360; 395/250, 287

[56] References Cited

U.S. PATENT DOCUMENTS

| 4,750,176 | 6/1988 | Van Veldhuizen | 370/85.1 X |
| 4,855,730 | 8/1989 | Venners et al. | 340/825.24 |
| 4,942,553 | 7/1990 | Dalrymple et al. | 395/250 |
| 5,255,180 | 10/1993 | Shinoda et al. | 340/825.24 X |
| 5,463,619 | 10/1995 | Van Steenbrugge et al. | 370/58.1 |

FOREIGN PATENT DOCUMENTS 8900717  10/1990  Netherlands .................. 370/85.1

OTHER PUBLICATIONS

IEEE Standards Draft, "Annex C. Cable Operation and Implementation Examples (informative)", In *High Performance Serial Bus, P1394/Draft 6.4v0, Oct. 14, 1993,* (IEEE).

*Primary Examiner*—Edwin C. Holloway, III
*Assistant Examiner*—William H. Wilson, Jr.
*Attorney, Agent, or Firm*—Jay H. Maioli

[57] ABSTRACT

A method of controlling communication for a communication system for connecting a plurality of electronic apparatuses through a communication control bus and allowing data communication between those electronic apparatuses wherein each of the electronic apparatuses performs connection control through the execution of a connection control command carried out by writing connection control information in a predetermined storage memory of its own or another electronic apparatus. The electronic apparatuses which attempt to write the connection control information transmit the write instructions to a predetermined storage memory. The storage memory which has received the write instructions, in turn executes only the earliest write instruction received and then transmits responses indicating whether the execution of the respective write instructions was successful or not.

8 Claims, 8 Drawing Sheets

FIG.4

| connection ID | Parameters of connection | | | | | |
|---|---|---|---|---|---|---|
| | Output node ID | Output plug No | Input node ID | Input plug No | BW | PB |
| 1 | VTR2 node ID | plug1 | VTR3 node ID | plug1 | BW | 1 |

FIG.5 (PRIOR ART)

——— P1394 SERIAL BUS

FIG. 6 (PRIOR ART)

CSP : CYCLE START PACKET
Iso : ISOCHRONOUS DATA PACKET
Async : ASYNCHRONOUS DATA PACKET

α : INFORMATION READ FROM REGISTER
β : NEW INFORMATION TO BE WRITTEN IN REGISTER
α' : INFORMATION WRITTEN IN REGISTER

(a) Input PSR (b) Output PSR

PC : Protect Counter    DR : Data Rate

COMMUNICATION SYSTEM AND ELECTRONIC APPARATUS

BACKGROUND OF THE INVENTION

1. Field of the Invention

The present invention relates to a technique for transferring digital data such as video data and audio data using a communication control bus such as a serial bus in compliance with IEEE-P1394 (hereinafter simply referred to as "P1394 serial bus") and a technique for successfully executing the earliest command among many transmitted substantially simultaneously from a plurality of apparatuses to a desired apparatus in a system for connecting a plurality of electronic apparatuses through a communication control bus on which control commands and data can coexist to allow data transfer between those electronic apparatuses.

2. Description of the Related Art

Systems have been proposed in which a plurality of electronic apparatuses are connected by a communication control bus, such as a P1394 serial bus, and on which control signals and information signals can coexist to allow the information and communication signals to be communicated between those apparatuses.

Figure 5:
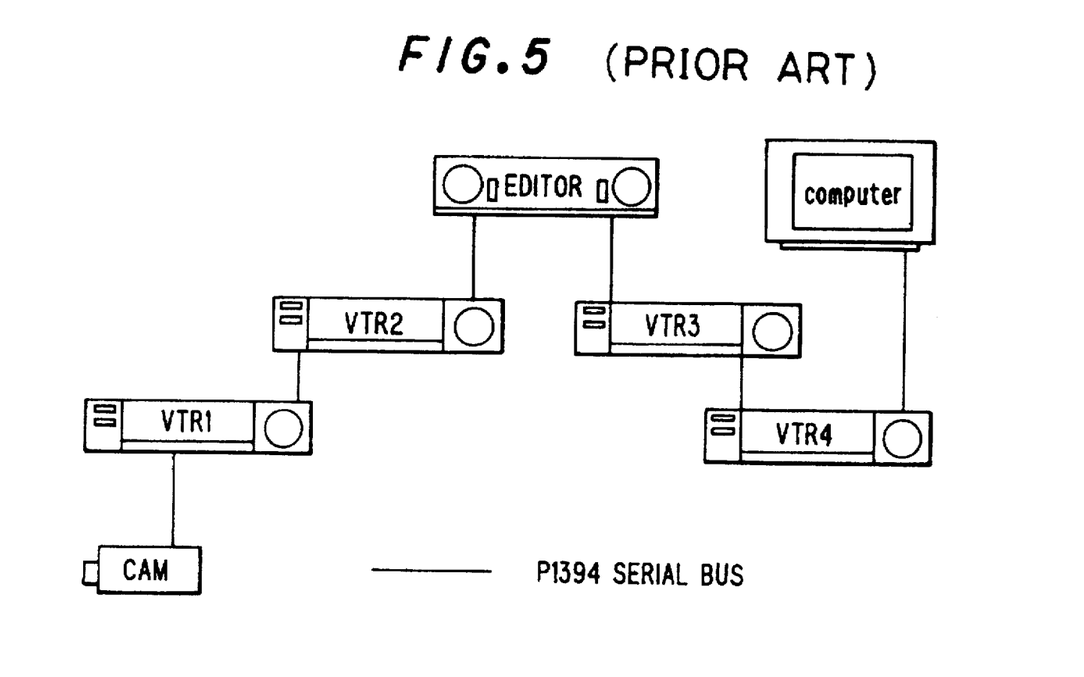
FIG. 5 illustrates an example of a communication system utilizing a P1394 serial bus.

FIG. 5 shows an example of such a system. This system includes four digital video tape recorders (hereinafter referred to as "VTR's"), one cam-corder (hereinafter referred to as "CAM"), one editor, and one computer. Those apparatuses are connected by twisted pair cables that form a P1394 serial bus. Since those apparatuses have a function of repeating information signals and control signals input from the twisted pair cables, this communication system is equivalent to a communication system in which the apparatuses are connected to a common P1394 serial bus.

The details of such a P1394 serial bus, including a procedure for assigning node ID's, are disclosed in "IEEE Specification for P1394 Serial Bus" (published on Oct. 14, 1993).

The applicant has made the following five patent applications which are related to this application.

European patent public disclosure No. 0614297

Japanese patent application No. 05126682

Japanese patent application No. 05200055

Japanese patent application No. 06051246

Japanese patent application No. 06134940

Applications for U.S. patent corresponding to these five applications are pending.

The above applications are owned by the assignee of the present invention and are hereby incorporated by reference.

Figure 6:
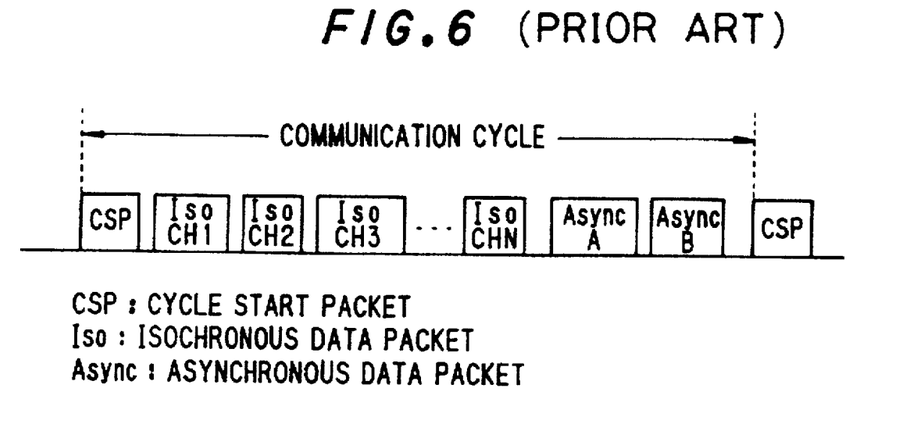
FIG. 6 illustrates an example of a data structure on the bus of a communication system utilizing a P1394 serial bus.

Data transfer among apparatuses sharing a bus is performed on a time division multiplex basis in predetermined communication cycles (for example, 125 μsec each) as shown in FIG. 6. Data transfer in a communication cycle is started when a predetermined apparatus such as an editor, which is referred to as a "cycle master", transfers an isochronous packet (cycle start packet which is hereinafter referred to as "CSP") indicating the beginning of the communication cycle to other apparatuses on the bus.

The form of data transferred in one communication cycle is classified into two types, i.e., isochronous data such as video and audio data and asynchronous data such as connection control commands (hereinafter referred to as "async data"). The transfer of an isochronous data packet precedes the transfer of an async data packet. A plurality of isochronous data packets can be distinguished from each other by assigning channel Nos. 1, 2, 3, . . . , N to respective isochronous packets. The period between the completion of the transmission of the isochronous data packets for all channels and the next CSP is used for the transfer of async data packets.

Figure 7:
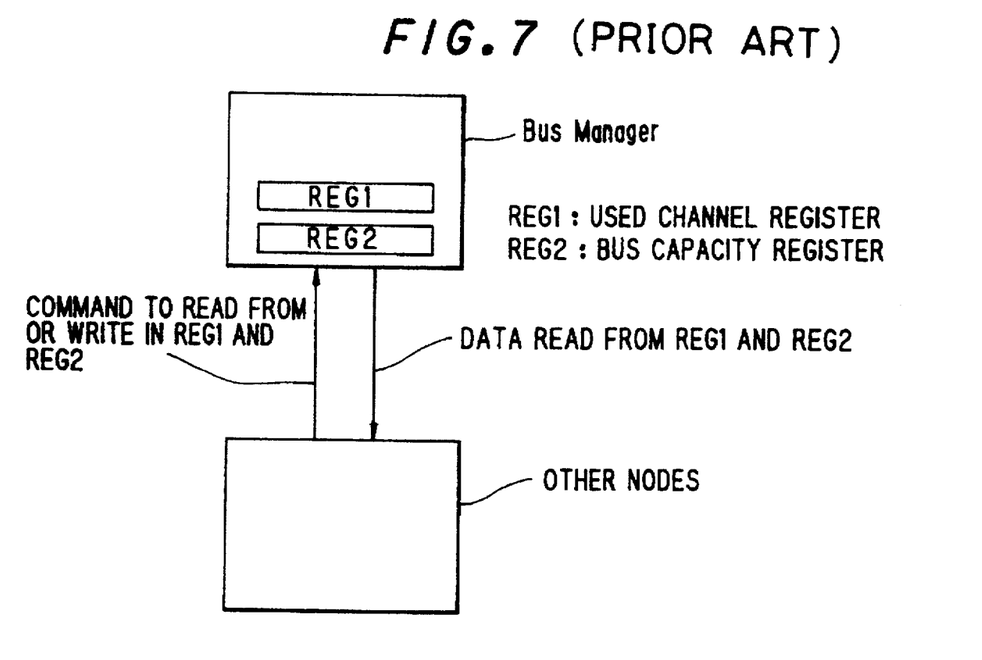
FIG. 7 illustrates how to reserve a channel and a band in a communication system utilizing a P1394 serial bus.

When an apparatus is going to transmit an isochronous data packet onto the bus, it first reserves a channel and a band required for the transfer of the data. For this purpose, the apparatus requests the required channel and band from a predetermined apparatus for managing the channels and bands of the bus (bus manager which is hereinafter referred to as "BM") such as a computer. As shown in FIG. 7, the BM has a register REG1 for indicating the state of utilization of each channel of the bus and a register REG2 for indicating the remaining capacity of the bus. The apparatus which is going to transmit an isochronous packet sends the registers REG1 and REG2 a read instruction using an async data packet to read the contents of the registers REG1 and REG2. If a free channel and a free capacity are available, the apparatus sends a write instruction to the BM using an async data packet to write the channel and the band it is going to use in the registers REG1 and REG2. If the writing into the registers REG1 and REG2 is successful, the apparatus is permitted to send its output onto the bus.

Figure 8:
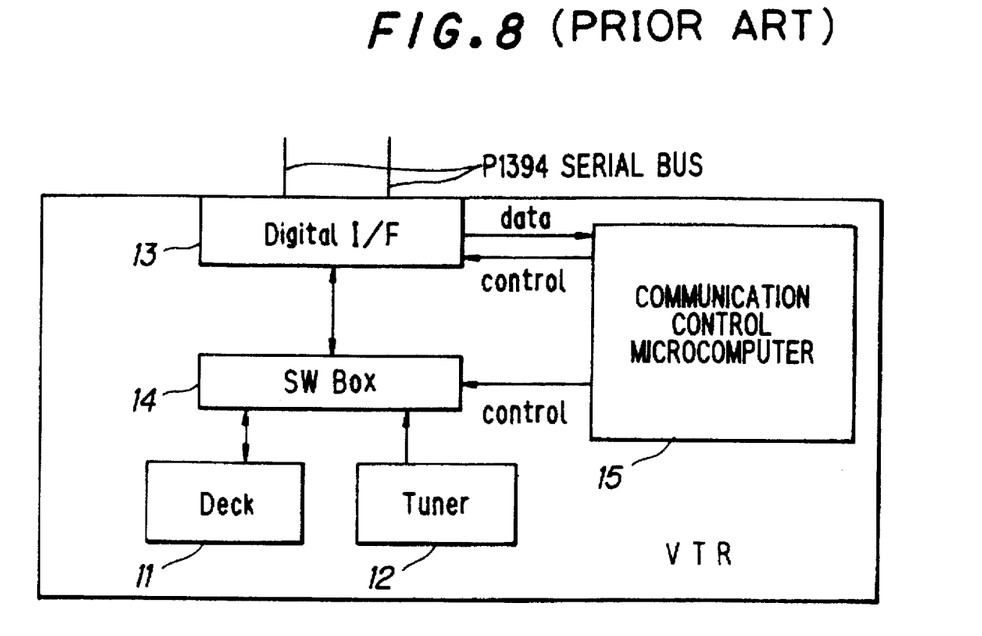
FIG. 8 illustrates a basic configuration of a VTR in the communication system shown in FIG. 5.

FIG. 8 shows a basic configuration of a VTR which is an apparatus included in the communication system shown in FIG. 5. This VTR includes a deck portion 11 and a tuner portion 12 which are essential functional units of a VTR and, in addition, a digital interface 13 for a P1394 serial bus, a switch box portion 14 for switching the digital interface 13 between the deck portion 11 and the tuner portion 12, and a communication control microcomputer 15. If the apparatus is a CAM it includes a camera portion instead of the deck portion 11 and the tuner portion 12. If the apparatus is an editor or a computer, it includes a portion for processing video data or computer data.

Figure 9:
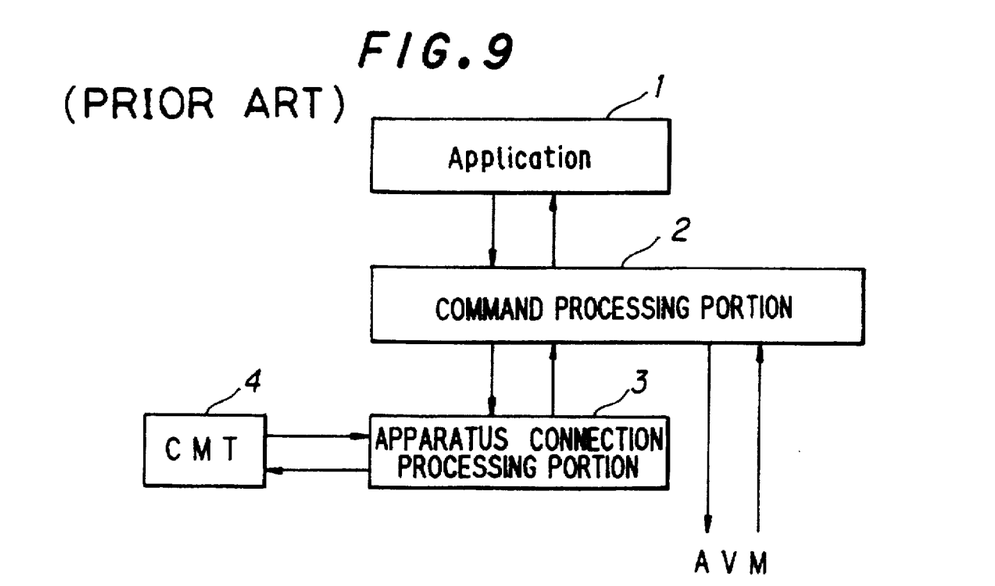
FIG. 9 illustrates layering for the transfer of processes between an application, a command processing portion, and an apparatus connection processing portion of a communication control microcomputer and the structure of a CMT in a VTR shown in FIG. 5.

Connection between electronic apparatuses in such a configuration is performed by a communication control microcomputer 15. FIG. 9 illustrates layering for the transfer of processes between an application 1, a command processing portion 2, and an apparatus connection processing portion 3 of the communication control microcomputer 15 and the structure of a table for managing the apparatus connection information (construction management table which is hereinafter referred to as "CMT").

The application 1 generates commands, including parameters such as communicating parties and bands, and sends them to the command processing portion 2. When the communication system has a representative apparatus which manages the connection between apparatuses throughout the communication system (hereinafter referred to as an audio video manager which is abbreviated as "AVM"), the command processing portion 2 passes apparatus connection processes to the AVM. On the other hand, if there is no AVM, the command processing portion 2 passes the parameters to its own apparatus connection processing portion 3. The apparatus connection processing portion 3 executes the apparatus connection process based on the parameters and registers the parameters in the CMT 4.

The AVM is an apparatus such as a computer which is capable of managing the communication system as a whole. In order for an apparatus to be an AVM, it must write its node. ID in AVM registers (not shown) of all the apparatuses in the system. An apparatus which has been successful in such writing serves as an AVM. Each apparatus in the system can determine whether there is an AVM in the system from whether such a node ID is written in its AVM register.

Communication systems utilizing a P1394 serial bus have been proposed as communication systems for connecting electronic apparatuses such as a video tape recorder, a television receiver (hereinafter referred to as "TV"), a VTR combined with a camera (hereinafter referred to as "CAM"), and a computer through a communication control bus on which control signals and data can coexist and for allowing the transmission and reception of control signals and data among those electronic apparatuses.

First, an example of such communication systems will be described with reference to FIG. 14. This communication system includes VTR's A, B, and C and an editor as electronic apparatuses. Connection is established using P1394 serial buses capable of transferring a mixture of control signals and data between the VTR A and the editor, between the editor and the VTR B, and between the VTR B and the VTR C. Since each of the electronic apparatuses has a function of repeating the control signals and data on a serial bus, this system is equivalent to a communication system in which electronic apparatuses are connected to a common P1394 serial bus.

Figure 14:
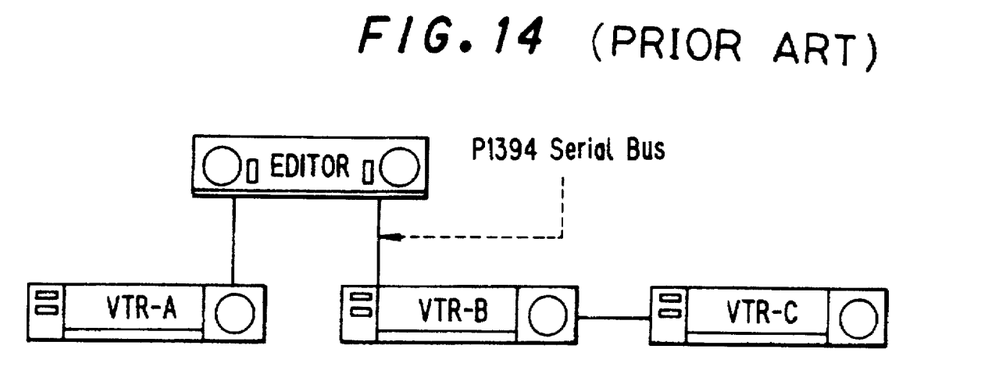
FIG. 14 illustrates an example of a communication system to which a plurality of apparatuses are connected through P1394 serial buses.

In the communication system shown in FIG. 14, communication is performed in predetermined communication cycles (e.g., 125 μs) as shown in FIG. 6. This system allows both isochronous communication wherein data such as digital AV signals are continuously transferred at a constant data rate, and asynchronous communication wherein control signals such as connection control commands are irregularly transferred as required.

A communication cycle is led by a cycle start packet CSP which is followed by a period set for the transmission of isochronous communication packets. A plurality of isochronous communications can be sent by respectively assigning channel Nos. 1, 2, 3, . . . , N to the isochronous communication packets. After the transmission of the isochronous communication packets over all the assigned channels is completed, the period before the next cycle start packet CSP is used for communication of asynchronous communication packets.

An apparatus which is going to transmit an isochronous packet to the bus first reserves the channel to be used and the band required for the transfer of the data. For this purpose, the apparatus requests the required channel and band from a bus manager which is an apparatus for managing the channels and bands of the bus (hereinafter referred to as "BM"). As shown in FIG. 7, the BM has a register REG1 for indicating the state of utilization of each channel of the bus and a register REG2 for indicating the remaining capacity of the bus. The apparatus which is going to transmit an isochronous packet sends the registers REG1 and REG2 a read instruction using an async data packet to read the contents of the registers REG1 and REG2. If a free channel and a free capacity are available, the apparatus sends a write instruction to the BM using an async data packet to write the channel and the band it is going to use in the registers REG1 and REG2. If the writing into the registers REG1 and REG2 is successful, the apparatus is permitted to send its output onto the bus. The BM is automatically determined according to a process specified in IEEE-P1394 specification when the communication system is configured by connecting a plurality of apparatuses to a P1394 serial bus.

Figure 15:
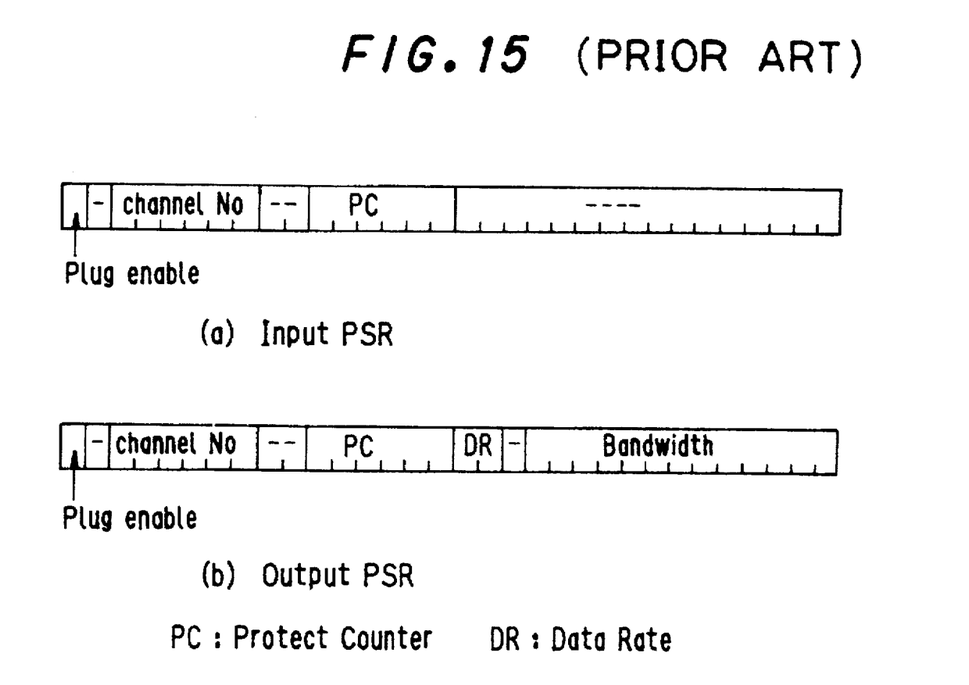
FIG. 15 illustrates examples of digital plugs.

The connection control over data communication in a communication system in which a plurality of electronic apparatuses are connected by a P1394 serial bus is performed using virtual digital plugs provided on the electronic apparatuses. Examples of virtual input and output plugs are shown in FIG. 15. Each of these digital plugs is a four-byte register provided in a communication control microcomputer of an electronic apparatus.

When a plug enable field in the digital input plug shown at (a) in FIG. 15 is set to 1, an isochronous communication packet is received from the channel whose channel No. is set. When the plug enable field of the input plug is cleared to 0, the reception is stopped. At this time, other fields of the plug are also cleared to 0. The LSB of a protect counter (PC) of the input plug is set to 1 to protect the connection of signals from the transmitting apparatus and is cleared to 0 to cancel the protection.

When a plug enable field in the digital output plug shown at (b) in FIG. 15 is set to 1, an isochronous communication packet is transmitted to the channel whose channel No. is set at the transmission rate specified at a data rate (DR) field using the band indicated by a bandwidth field. When the plug enable field of the output plug is cleared to 0, the transmission is stopped. At this time, other fields of the plug are also cleared to 0. The number of the apparatuses requesting protection is counted by incrementing a protect counter of the output plug by 1 when the connection of signals to a receiving apparatus is to be protected and by decrementing it by 1 when the protection is canceled.

These plugs can be rewritten by either the apparatus to which the plugs belong or other apparatuses using a P1394 serial bus transaction. It should be noted that such rewriting must be performed only when the values in the protect counters are 0 in order to protect connection. The marks "-", "--", and "---" in each of the plugs in FIG. 15 represent reservation bits.

Assume that, in the communication system having the configuration as described above, the VTR's B and C substantially simultaneously transmit commands to request the VTR A to output isochronous communication packets while no isochronous communication is being performed between the apparatuses. In order to successfully execute the command which has arrived earliest at the VTR A, a method may be employed wherein each of the apparatuses communicates with the digital plugs of the VTR A using P1394 serial bus read and write transactions.

Figure 16:
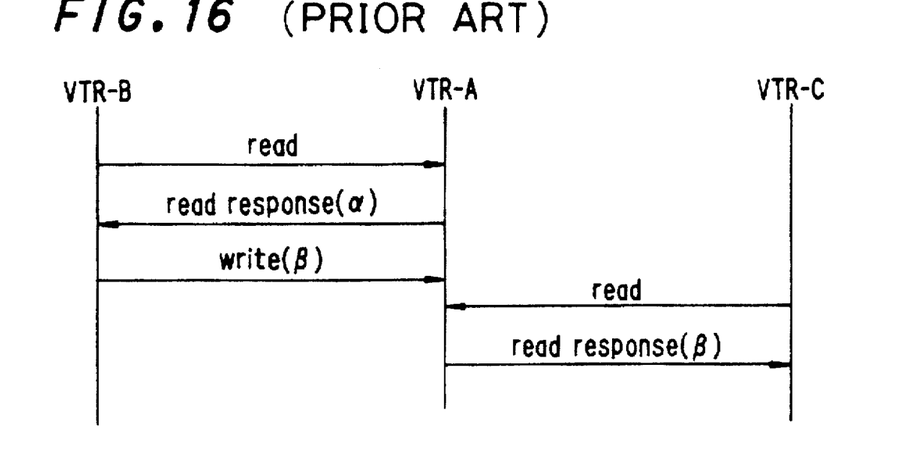
FIG. 16 illustrates an example of a command processing step.

Assume that the VTR B has transmitted the command slightly earlier than that of VTR C as shown in FIG. 16. Then, when the VTR B first reads the contents of the digital output plug of the VTR A, the VTR A returns information α as the response thereto on the output plug such as whether the VTR A is outputting and whether it is protected. When the VTR B recognizes from the read information α that the VTR A is neither outputting nor protected, the VTR B writes information β such as the output channel No. in the digital plug of the VTR A to complete the setting for output. If the VTR C transmits the same command to the VTR A with a slight delay, the VTR C receives a response β including information indicating that the VTR A is already outputting when it reads the contents of the digital output plug of the VTR A. Thus, the VTR C recognizes that the execution of the command has failed, and the process terminates with no writing performed.

However, if a process utilizing P1394 serial bus read and write transactions is performed to execute the command which has arrived earlier as described above, no protection is provided for the communication during the period between the read and write operations. Therefore, another apparatus can perform communication during the period between the read and write operations.

Figure 17:
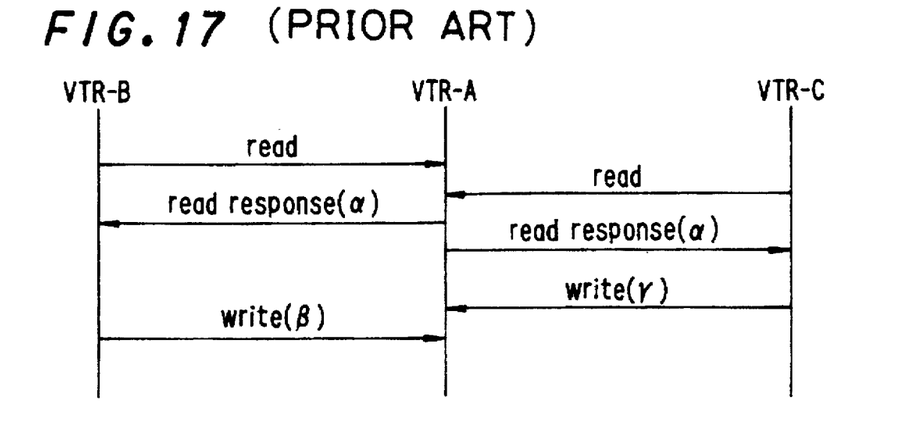
FIG. 17 illustrates an example of a conventional command processing step carried out when a plurality of apparatuses have substantially simultaneously transmitted commands.

For example, assume that the VTR B reads the contents of the digital output plug of the VTR A and receives the response α and, thereafter, the VTR C reads the contents of the digital output plug of the VTR A and recognizes from the response α that there is no protection, as shown in FIG. 17. Then, the VTR C can write information γ. In this case, if the writing by the VTR C takes place earlier than the writing by the VTR B as illustrated, the VTR C first causes the VTR A to complete the setting for output. Since the VTR B is not aware of the interception, it overwrites the information β in the digital output plug of the VTR A to cause the VTR A to complete the setting for output.

In this case, the VTR B which has transmitted the write transaction later is successful in the execution of the command while the VTR C which has transmitted the write transaction earlier fails. However, both of the VTR's B and C assume that they are successful. If the VTR's B and C have requested output over different channels, the VTR C which has failed the execution of the command may not receive anything over the reception channel or may receive data transmitted by another apparatus.

Figure 18:
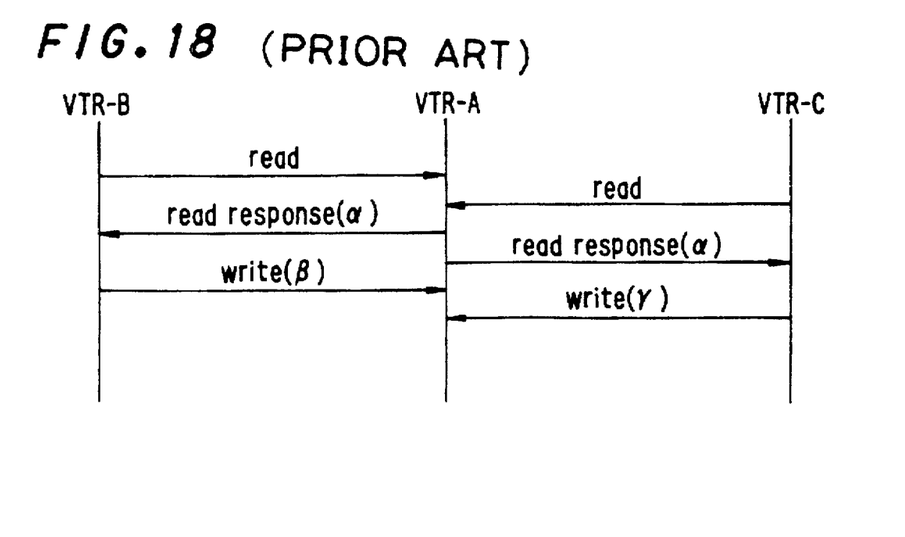
FIG. 18 illustrates another example of a conventional command processing step carried out when a plurality of apparatuses have substantially simultaneously transmitted commands.

In FIG. 18, similarly, the VTR B reads the contents of the digital output plug of the VTR A and receives the response α and, thereafter, the VTR C reads the contents of the digital output plug of the VTR A. Thereafter, the VTR B writes the information β because it recognizes from the result of the reading that there is no protection. Further, the VTR C also writes the information γ because there has been no protection when it has performed a reading. As a result, at the digital output plug of the VTR A, the VTR B completes the setting for output by performing writing and, thereafter, the VTR C completes the setting for output by performing overwriting.

In this case, again, although the VTR C which has transmitted the write transaction later is successful in the execution of the command while the VTR B which has transmitted the write transaction earlier fails, both of the VTR's B and C assume that they are successful. Therefore, if the VTR's B and C have requested output over different channels, the VTR B which has failed the execution of the command may not receive anything over the reception channel or may receive data transmitted by another apparatus.

The present invention has been developed in order to overcome such problems, and it is an object of the present invention to provide a method of controlling communication and an electronic apparatus wherein a command which has been transmitted earlier is reliably executed and wherein it is possible to check whether the execution of a command has been successful or not.

SUMMARY OF THE INVENTION

In order to overcome the above-described problems, according to the present invention, there is provided a method of controlling communication for a communication system for connecting a plurality of electronic apparatuses through a communication control bus and allowing data communication between those electronic apparatuses wherein each of the electronic apparatuses performs connection control through the execution of a connection control command carried out by writing connection control information in a predetermined storage means of its own or another electronic apparatus, characterized in that the electronic apparatuses which attempt to write the connection control information transmit the write instructions to a predetermined storage means and, the storage means which has received the write instructions executes only the earliest write instruction and then transmits responses indicating whether the execution of the respective write instructions was successful or not.

For example, an electronic apparatus which attempts to write connection control information transmits a write instruction including first information and second information to be written, and the storage means performs rewriting to replace the third information stored therein with the first information only if the third information agrees with the first information and then transmits the third information. The first information is preferably information read from a storage means.

According to the present invention, there is provided an electronic apparatus used in a communication system for connecting a plurality of electronic apparatuses through a communication control bus and allowing data communication between those electronic apparatuses, characterized in that it includes a storage means in which connection control information for executing a connection control command is stored and in that the storage means stores only the connection control information provided by the earliest write instruction from among multiple write instructions it receives and then transmits responses indicating whether the execution of the write instructions was successful or not.

According to the present invention, only the connection control information provided by the earliest write instruction is stored in the storage means. Then, responses are transmitted which indicate whether the execution of write instructions was successful or not. This ensures that the earliest command which has arrived at a predetermined storage means of an electronic apparatus is executed and makes it possible to confirm whether the execution of the commands was successful or not.

As detailed above, the present invention makes it possible to maintain connection between apparatuses in a communication system whether or not there is an electronic apparatus which manages the connection between the apparatuses throughout the system before and after a bus reset.

Further, according to the present invention, the new audio video manager established after a bus reset need not request connection information from each apparatus. Since the process at a bus reset is automatically performed, the user need not care about the bus resets.

As described in detail above, the present invention makes it possible to simply and reliably execute connection control commands in their order of arrival and to confirm whether the execution of each command was successful or not. This facilitates the implementation of an apparatus connection processing portion in the hardware and results in an increase in processing speed and a reduction in the cost of the processing portion.

DETAILED DESCRIPTION OF THE PREFERRED EMBODIMENTS

Embodiments of the present invention will now be described with reference to the drawings. The description will be made on the following points.

[1] Registration in and deletion from a CMT in an embodiment of the invention

[2] Processes at a bus reset (2-1) Process performed when there is no AVM both before and after a bus reset (2-2) Process performed when no AVM exists before a bus reset and an AVM is established after the reset (2-3) Process performed when an AVM exists before a bus reset and not after the reset

[1] Registration In and Deletion from a CMT In an Embodiment of the Invention

Figure 1:
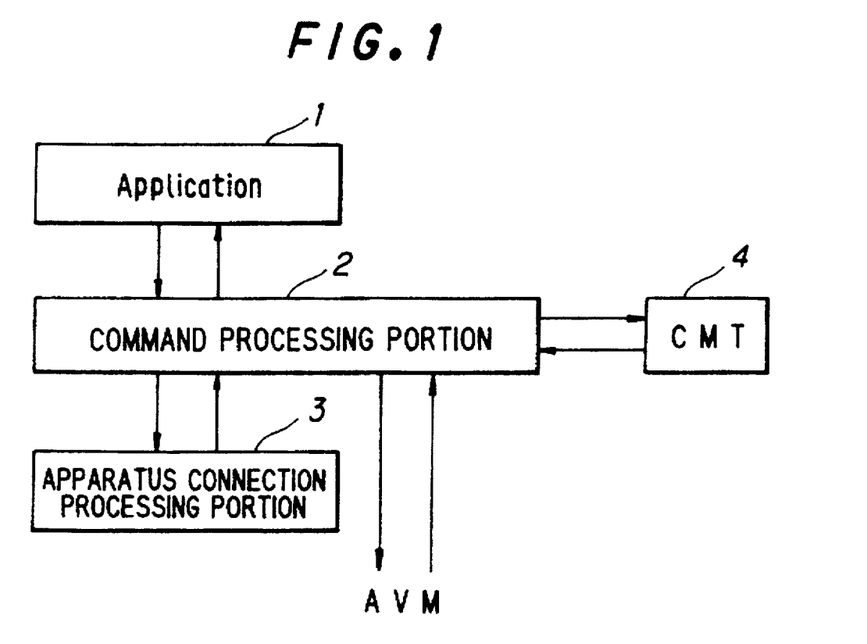
FIG. 1 illustrates layering for the transfer of processes between an application, a command processing portion, and an apparatus connection processing portion of a communication control microcomputer and the structure of a CMT according to an embodiment of the present invention.

FIG. 1 illustrates layering for the transfer of processes between an application 1, a command processing portion 2, and an apparatus connection processing portion 3 of a communication control microcomputer and the structure of a CMT according to an embodiment of the present invention.

In the present embodiment, when the application 1 creates a command including connection parameters in response to an operation performed by the user, the command processing portion 2 assigns a connection ID which is uniquely defined among the apparatuses to each connection and registers it together with the parameters passed from the application 1 in the CMT 4. The command processing portion 2 passes this connection ID to the application 1 as a response. Thereafter, connection parameters are uniquely determined only by the transmission of a command having a connection ID performed by the application 1.

When there is no AVM in the communication system, the command processing portion 2 transmits the command including the connection parameters registered in the CMT 4 to its own apparatus connection processing portion 3. The apparatus connection processing portion 3 executes an apparatus connection process according to the parameters. On the other hand, if there is an AVM, the command processing portion 2 transmits the command including the connection parameters registered in the CMT 4 to the AVM to have it perform the apparatus connecting process.

When the command processing portion 2 receives an apparatus disconnect command from the application 1, it determines whether there is an AVM in the communication system. As described above, the disconnect command is a command using a connection ID. If there is no AVM, the command processing portion 2 transmits the disconnect command to its own apparatus connection processing portion 3. If there is an AVM, it transmits the disconnect command to the AVM. After an apparatus disconnect process is carried out by the apparatus connection processing portion 3 or the AVM, the command processing portion 2 deletes the connection ID and the parameters from the CMT 4.

The portion of each apparatus that performs apparatus connection has been described. Basically, an AVM has the same configuration except that it transmits and receives apparatus connection information to and from each apparatus.

The following discussion concerns the situation in the communication system shown in FIG. 5, where the CAM is reproducing, the VTR 1 is recording, and the editor is operating the VTR 2 and VTR 3.

Figure 2:
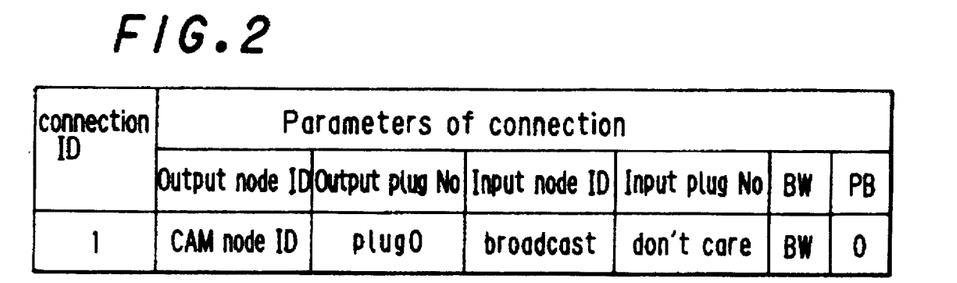
FIG. 2 illustrates the contents of a CMT of a CAM according to the embodiment of the present invention.

FIG. 2 shows the contents of the CMT that the CAM is set to. In FIG. 2, the output node ID assigned to the parameters is the ID of the apparatus outputting information signals (which is the node ID of the CAM in this case). The output plug No. is the number assigned to the plug outputting the information signals (which is the plug 0 in this case). The input node ID is the ID of the apparatus to which the information signals are being input. In this case, since the CAM is in a reproduction mode wherein it outputs the information signals to the bus, the ID is "broadcast". The input plug No. is the number assigned to the plug to which the information signals are being input. In this case, since a broadcast is being output, the input plug No. is marked "don't care". The parameter BW (bandwidth) represents the band required for the transmission of the information signals. The parameter PB (protect bit) indicates whether the connection of the apparatus is protected. In this case, since it is set to 0, there is no protection. A connection ID=1 is assigned to the apparatus connection having such parameters.

Figure 3:
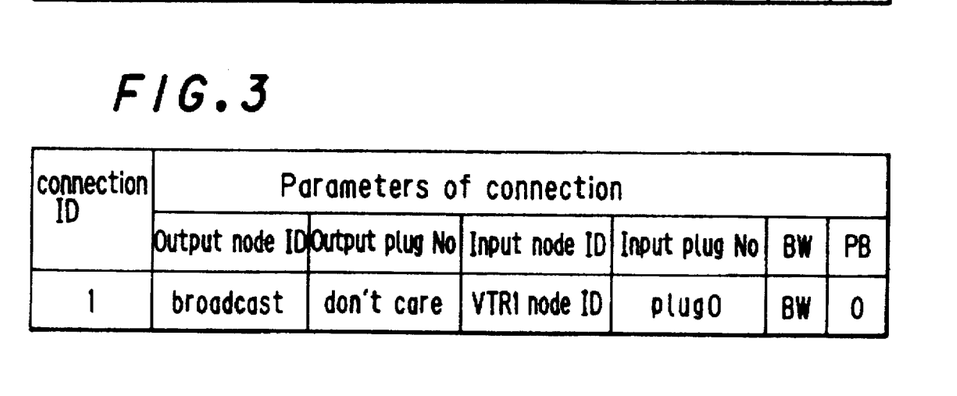
FIG. 3 illustrates the contents of a CMT of a VTR 1 according to the embodiment of the present invention.

Similarly, the CMT contents of the VTR 1 is shown in FIG. 3. The output node ID parameter "broadcast" indicates a state wherein the input comes from a default (fixed) channel.

Figure 4:
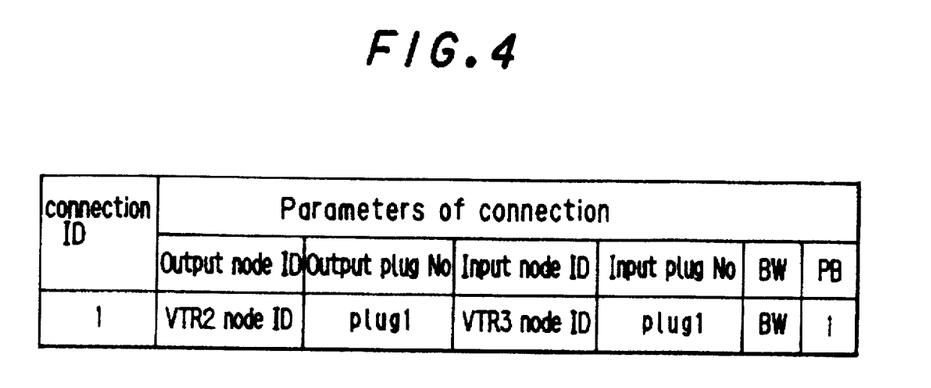
FIG. 4 illustrates the contents of a CMT of an editor according to the embodiment of the present invention.

Further, the CMT contents of the editor is shown in FIG. 4. When connection between apparatuses is provided by an apparatus such as an editor capable of managing other apparatuses, such connection is referred to as a one-to-one connection. In the case of a one-to-one connection, the parameter PB is set to 1 because connection between apparatuses is protected.

When the connection is established for a broadcast, although the connection between the apparatuses is not normally protected, a configuration may be employed in which the protection of the connection between the apparatuses can be set by a user. In this case, the command processing portion 2 receives a request for a protection process from the application 1. When the command processing portion 2 has performed the protection process, the PB of the corresponding connection ID on the CMT 4 is set to 1. When a protection canceling process has been performed, the PB is set to 0. In the case of the one-to-one connection, since such connection is always protected, the PB is set to 1 at the time of registration.

[2] Processes At a Bus Reset

Processes at a bus reset will now be described.

(2-1) Process Performed When There Is No AVM Both Before and After a Bus Reset

If no AVM exists both before and after a bus reset, the command processing portion 2 of the CAM which has been outputting a broadcast passes the connection process on the CMT 4 to its own apparatus connection processing portion 3. Similarly, the editor passes the one-to-one connection process between the VTR 2 and the VTR 3 registered on the CMT 4 to its own apparatus connection processing portion 3. The connection between those apparatuses is maintained if the apparatus connection processes are actually carried out. Then, the VTR 1 to which the broadcast has been input may continue to receive the input over a default channel.

An example of the case wherein no AVM exists both before and after a bus reset will be described with reference to a case wherein the recording operation performed between the CAM and the VTR 1 is stopped and the power supply of the CAM is turned off.

When the recording operation of the VTR 1 and the reproducing operation of the CAM are stopped, the application 1 of the CAM passes a command to disconnect the broadcast output to the command processing portion 2. Since there is no AVM in the system, the command processing portion 2 passes this command to its own apparatus connection processing portion 3. When the process for disconnecting the apparatuses is completed, the command processing portion 2 deletes the connection process corresponding to the connection ID of the disconnect command told by the application 1 from the CMT 4. Thereafter, a bus reset takes place when the power supply of the CAM is turned off. After the bus reset, since there is no AVM in the system, the editor requests a one-to-one connection process from its own apparatus connection processing portion 3. The apparatus connection processing portion 3 reacquires the band and channel to reestablish the connection between the apparatuses. Thus, the editing operation performed between the VTR's 2 and 3 by the editor is maintained.

(2-2) Process Performed When No AVM Exists Both Before and After a Bus Reset

Next, a description follows of on a case wherein no AVM exists both before and after a bus reset. Here, it is assumed that a computer becomes the AVM and understands the system as a whole.

After the bus reset, since there is a computer as an AVM in the system, the command processing portion 2 of the editor passes a one-to-one connection process command to the AVM. The AVM passes the apparatus connection process received from the command processing portion 2 of the editor to its own apparatus connection processing portion 3 to undertake the acquisition of the band and channel and performs the connection process. Assume that the operation between the VTR's 1 and 4 is performed thereafter through an operation on the computer. Then, the computer recognizes the band and channel used by the editor and performs its own operations such as editing using other channels. An AVM can disconnect the connection between other apparatuses by force if it is necessary for effective utilization of the bus as a whole.

(2-3) Process Performed When an AVM Exists Before a Bus Reset and Not After the Reset A description follows of a case wherein an AVM exists before a bus reset and not after the reset. When the computer discontinues to manage the system as an AVM after completing the editing operation thereon and causing a bus reset, the editor now recognizes that there is no AVM and transmits a one-to-one connection command to its own apparatus connection processing portion 3. Since the apparatus connection processing portion 3 of the editor executes a one-to-one connection process according to this command, the editing operation between the VTR's 2 and 3 is continued. On the other hand, since the computer has discontinued to manage the system as an AVM and the CMT 4 has now been cleared, the connection between the VTR's 1 and 4 is not reestablished and the connection between the VTR's 1 and 4 which had been controlled on the computer remains disconnected.

As described above, according to the present embodiment, the command processing portion 2, which is the upper control layer, manages the CMT 4 and transmits the process on the CMT 4 to the AVM or its own apparatus connection processing portion 3 after checking for the presence of the AVM. Therefore, the connection between the apparatuses on the system can be maintained regardless of the presence and changes of the AVM before and after a bus reset. In addition, a new AVM need not request connection information on the CMT 4 from each apparatus.

Thus, when some editors or the like are removed or added during the execution of a plurality of editing operations, although the apparatuses which have engaged in the relevant editing operations are disconnected, other one-to-one connections are maintained. This satisfies the philosophy behind IEEE-P1394 specification that the removal or addition of apparatuses on a system must not adversely affect other apparatuses.

Further, according to the present embodiment, a uniquely defined connection ID is assigned to each connection and is registered in the CMT 4 along with parameters passed by the application 1. Thereafter, the application 1 can cause the command processing portion 2 to uniquely determine connection parameters and to create a command using the parameters corresponding to the connection ID simply by transmitting thereto a command using the connection ID.

Although commands using connection parameters are transmitted between the command processing portion of each apparatus and the command processing portion of the AVM in the above-described embodiment, a configuration may be employed in which: the AVM is added with an ability to manage defined connection ID for each apparatus; a command including a connection ID and parameters is temporarily transmitted; and, after the command is registered in the CMT of the AVM, commands using the connection ID are exchanged.

Another embodiment of the present invention will now be described in detailed.

According to the present embodiment, an apparatus connection process is performed in the communication system shown in FIG. 14. As described above, in order to perform an apparatus connection process, apparatus connection information must be written in the digital plugs. In the present embodiment a compare and swap (C & S) transaction, which is one of P1394 serial bus lock transactions, is used to write the apparatus connection information.

In the C & S transaction, a write instruction which is a combination of the first data read from a register and the second data to be newly written in the register is sent, and the register compares the third data currently written therein with the first data and, only when they agree with each other, rewrites the third data into the second data. Then, the third data is transmitted to the apparatus which has sent the write instruction.

Figure 10:
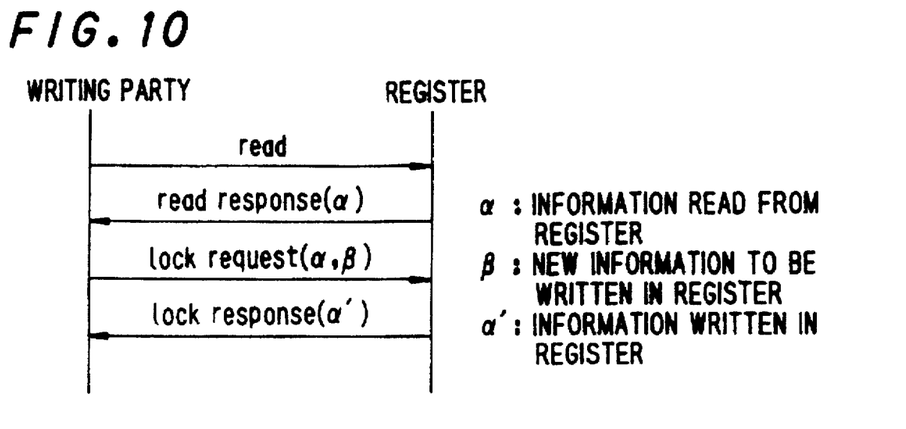
FIG. 10 illustrates an example of a command processing step according to the present invention.

Referring to FIG. 10, when the writing party first reads the contents of the register, the register returns information α on the contents of the register as a response (read response). The process step so far is the same as in the prior art. Next, the writing party sends the register a write instruction (lock request) which is a combination of the read from register contents information α and the new information β, to be newly written in the register. Only when the register contents information α read from the register and thereafter sent by the writing party agrees with the contents information α' currently written in the register, does the register write the information on its contents into the information β and, further, transmits the contents information α' to the writing party (lock response). Unless a write instruction from another apparatus is successfully executed during the period between the response from the register (read response) and the write instruction, α equals α', which means that the writing has been successful and which thereby allows the writing party to confirm the successful writing.

Figure 11:
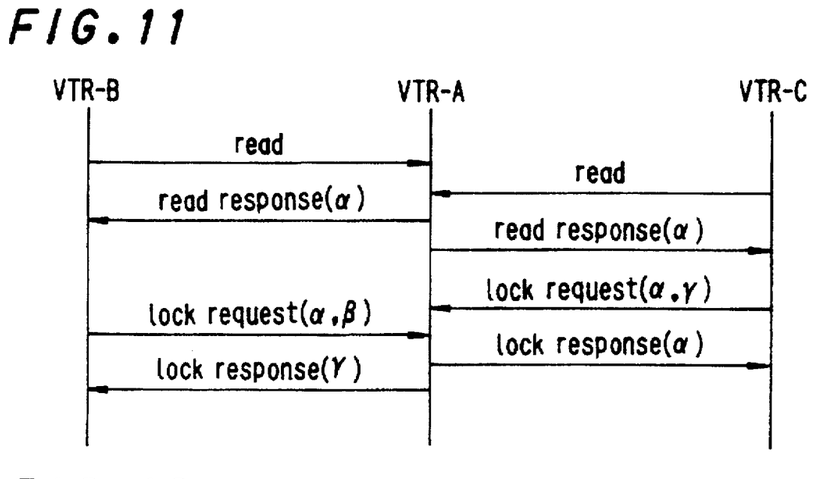
FIG. 11 illustrates an example of a processing step carried out when a plurality of apparatuses have substantially simultaneously transmitted commands according to the present invention.
Figure 12:
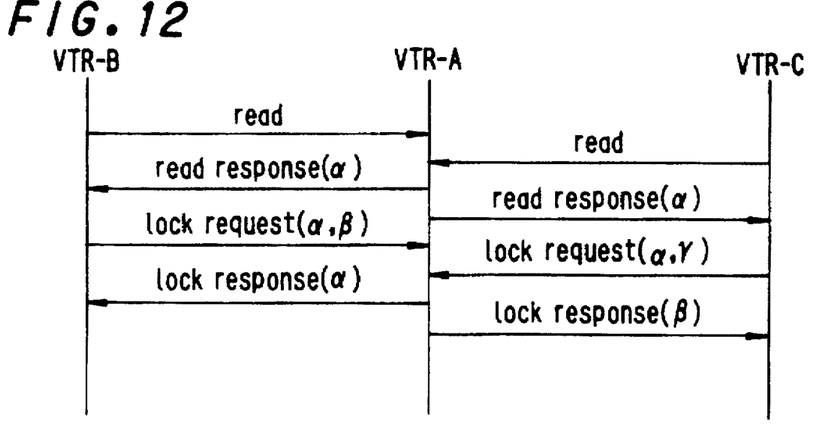
FIG. 12 illustrates another example of a processing step carried out when a plurality of apparatuses have substantially simultaneously transmitted commands according to the present invention.

FIG. 11 and FIG. 12 show cases corresponding to those shown in FIG. 17 and FIG. 18. In FIG. 11, if the VTR C transmits a write instruction earlier, the VTR A rewrites the information on the digital output plug into information γ and transmits the information α on the digital output plug before the rewriting to the VTR C. Thus, the VTR C can confirm that the writing has been successful. However, when the VTR B transmits a write instruction, the contents of the digital output plug have been changed to the information γ which does not agree with the read information α. Therefore, no writing takes place, and information γ which is the contents of the digital output plug is transmitted to the VTR B. Thus the VTR B can confirm that the writing has not been successful because γ≠α. As shown in FIG. 12, similarly, the VTR B, which has transmitted a write instruction earlier, is successful in writing while the VTR C, which has transmitted a write instruction later, fails.

As described above, according to the present embodiment, the apparatus which has transmitted a write instruction earlier is always successful in writing. Further, both the successful and failed apparatuses can confirm whether the writing has been successful.

Next, as an example of connection control, a case wherein the VTR A outputs a broadcast will be described with reference to the flow chart shown in FIG. 13. First, a process of acquiring a broadcast channel is performed at step S1. If the acquisition is successful, the process proceeds to step S2 and, if the acquisition is unsuccessful, the process ends. At step S2, a process of acquiring a bandwidth for the broadcast is performed. If the acquisition is successful, the process proceeds to step S3 and, if the acquisition is unsuccessful, the process proceeds to step S5.

The method of acquiring the bandwidth and channel according to the present invention will be described more specifically. As previously described, in a communication system utilizing a P1394 serial bus, an apparatus which attempts to transmit an isochronous communication packet must write the channel to be used and the required bandwidth in the registers REG1 and REG2 of the BM. If this writing is successful, the transmission of the isochronous communication packet is enabled. According to the present invention, a P1394 C & S transaction is used to write the channel and bandwidth to be used.

Specifically, at step S1, a transaction (read) is transmitted to read the register REG1 of the BM and free channels are checked from the response thereto (read response). If the broadcast channel (a predetermined channel which is the default to be used for a broadcast) is busy, the acquisition of the channel has been successfully.

If the broadcast channel is free, a write instruction (lock request) is transmitted which is a combination of the read value of the register REG1 and a value whose bit corresponding to the broadcast channel is set to 0. As a result, if the value of the register REG1 included in the write instruction is returned as the response from the BM (lock response), the acquisition of the broadcast channel has been successful. If another value is returned, the channel acquisition has been unsuccessful. Then, the process is repeated starting with the step of checking whether the broadcast channel is busy after the returned value is examined.

Similarly, a process of acquiring the bandwidth is performed on the register REG2 at step S2. Specifically, a transaction (read) for reading the register REG2 of the BM is transmitted to check the currently remaining bandwidth from the response (read response) thereto. If the remaining bandwidth is smaller than the bandwidth required for outputting the data, the process fails. Conversely, if the remaining bandwidth is larger than the bandwidth required for outputting the data, a write instruction (lock request) is sent. This write instruction includes a combination of the value read from the register REG2 and a value obtained by subtracting the bandwidth required for outputting the data from the value read from the register REG2. If the same value as the value in REG2 set in the write instruction is returned from the BM (lock response), the acquisition of the bandwidth is successful. If another value is returned, the process fails. Then, the process is repeated starting with the step of checking the relationship between the sizes of the currently remaining bandwidth and the bandwidth required for outputting the data after the returned value is examined.

Figure 13:
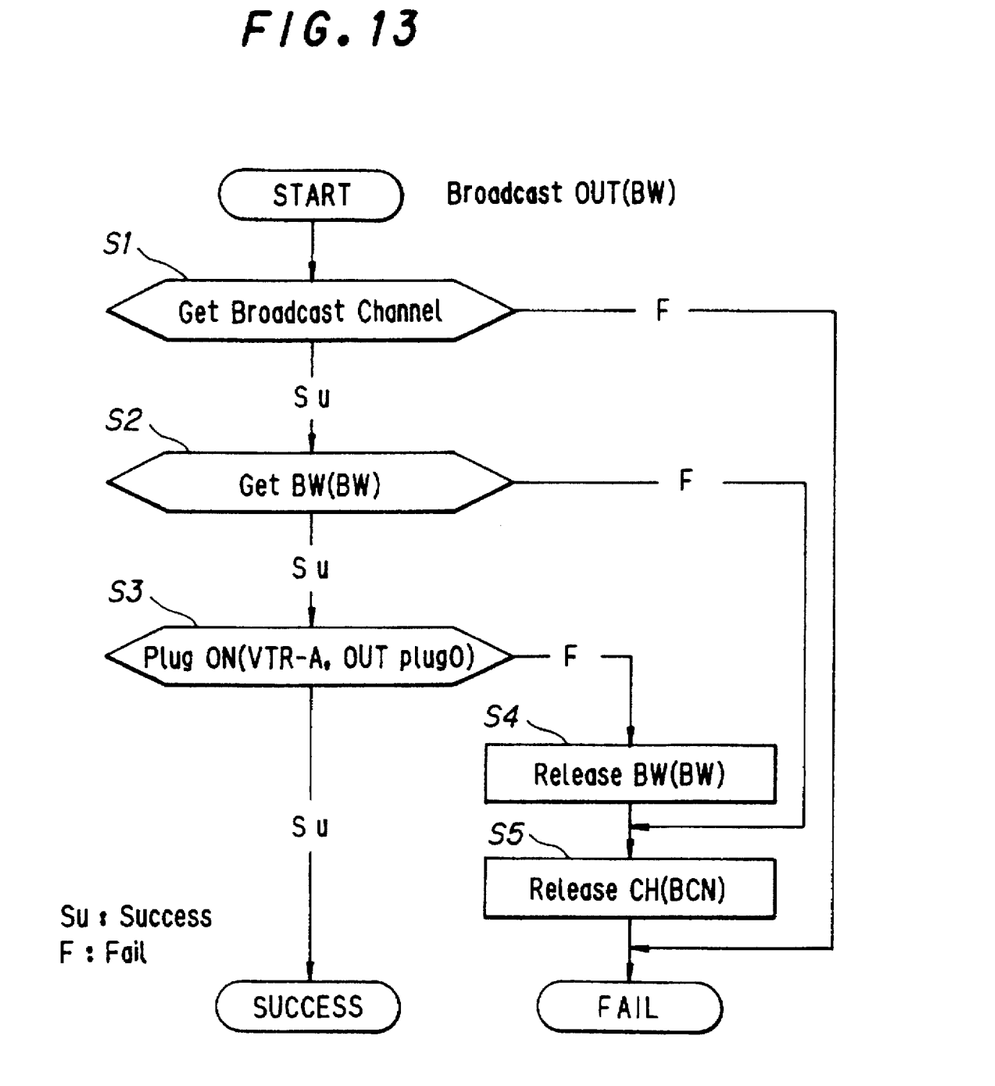
FIG. 13 illustrates the flow of processes performed by a VTR A when it outputs a broadcast.

Next, as shown in FIG. 13, its own digital output plug O is set to an ON state at step S3. The digital output plug O is the default for outputting a broadcast. If the setting is successful, the process is terminated (success) and, if it fails, the process proceeds to step S4. Specifically, the contents of the digital output plug is read, and the process fails if the response (read response) indicates that there is protection. If not protected, the plug is turned on by the C & S transaction.

Specifically, a write instruction (lock request) is sent in which the value of the response read from the digital output plug and the values of the plug enable=1, BCN (broadcast channel No.), DR, and BW of the digital output plug are set, and the process is successful if the value of the digital output plug O included in the write instruction is returned as the response thereto (lock response). If another value is returned, the process has failed. Then, the process is repeated from the step of checking whether there is protection after the value is examined.

Next, as shown in FIG. 13 the band acquired at step S2 is released at step S4, and the broadcast channel acquired at step S3 is released at step S5. These releasing processes also use the C & S transaction. Specifically, at step S4, the contents of the register REG2 of the BM is read; a write instruction which is a combination of this read value and a value obtained by adding the band acquired at step S2 to this value; and the releasing of the channel is finished if the response from the BM is the same as the value of the register REG2 included in the write instruction. If another value is returned the process is repeated starting with the step of sending a write instruction which is a combination of the returned value and a value obtained by adding the band acquired at step S2 to this value. Step S5 proceeds similarly.

The present invention is not limited to the above described embodiments, and various modifications are possible based on the principles of the present invention. For example, an arrangement may be made wherein the exchange of the write instruction (read) and the response thereto (read response) shown in FIG. 10 is omitted and only the C & S transaction is used. This allows the number of communications to be reduced. This is effective where the register information can be guessed at as in the initial state.

Although the above-described embodiments use a P1394 serial bus as the communication control bus, the present invention may be implemented using other communication control buses as long as a mixture of control signals and data can be transferred.

Since numerous modifications and changes will readily occur to those skilled in the art, it is not desired to limit the invention to the exact construction and operation as illustrated and described. Hence, all suitable modifications and equivalents may be understood as falling within the scope of the invention.

What is claimed is:

1. A communication method for connecting a plurality of electronic apparatuses by a communication between said electronic apparatuses comprising the steps of:

executing a connection control command during connection control by each of the electronic apparatuses by reading existing connection control information from a predetermined storage means of its own or another electronic apparatus;

transmitting write instructions from electronic apparatuses which are going to write new connection control information to the storage means;

executing only the earliest write instruction received at the storage means which has received multiple ones of said write instructions; and transmitting, for each write instruction, responses indicating whether the execution of the write instruction has been successful.

2. The communication method according to claim 1, wherein said electronic apparatuses which are going to write connection control information transmit write instructions including first information and second information to be written and wherein the storage means rewrites third information stored therein into said first information only when said third information agrees with said first information and then writes said third information.

3. The communication method according to claim 2, wherein said first information is the information read from the storage means.

4. The communication method according to claim 1, further comprising the step of connecting the apparatuses again based on the connection control information in the storage means in the event of a bus reset during data communication.

5. The communication method according to claim 4, wherein if there is an electronic apparatus managing the connection of the apparatuses throughout the system, said electronic apparatus undertakes the step of connecting the apparatuses and wherein, if there is no electronic apparatus managing the connection of the apparatuses throughout the system, the connecting step is performed by each electronic apparatus on its own.

6. The communication method according to claim 5, wherein the connection information relating to the connection between the apparatuses includes both identification information uniquely defined for each connection and parameters for said connection.

7. An electronic apparatus for use in a communication system for connecting a plurality of electronic apparatuses by a communication control bus and for performing data communication between said electronic apparatuses comprising:

storage means to which connection control information for executing a connection control command is written; and control means for performing control so that said storage means stores only the connection control information associated with the earliest write instruction received and then transmits responses, for each write instruction, indicating whether the execution of the write instruction has been successful.

8. The apparatus according to claim 7, further comprising control means for connecting the apparatuses again based on the connection information stored in said storage means in the event of a bus reset during data communication.

* * * * *